United States Patent
Kim

(10) Patent No.: US 11,598,709 B2
(45) Date of Patent: Mar. 7, 2023

(54) METHOD FOR PREDICTING FILTER PURIFYING EFFICIENCY AND EXCHANGE TIME USING MACHINE LEARNING

(71) Applicant: LG ELECTRONICS INC., Seoul (KR)

(72) Inventor: Youngsub Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 640 days.

(21) Appl. No.: 16/692,929

(22) Filed: Nov. 22, 2019

(65) Prior Publication Data
US 2020/0088621 A1  Mar. 19, 2020

(30) Foreign Application Priority Data
Aug. 30, 2019  (KR) .................. 10-2019-0107768

(51) Int. Cl.
| | | |
|---|---|---|
| *G01N 15/06* | (2006.01) | |
| *G06N 3/08* | (2006.01) | |
| *G01N 15/08* | (2006.01) | |
| *G06N 3/04* | (2006.01) | |

(52) U.S. Cl.
CPC ............. *G01N 15/06* (2013.01); *G01N 15/08* (2013.01); *G06N 3/04* (2013.01); *G06N 3/08* (2013.01); *G01N 2015/084* (2013.01)

(58) Field of Classification Search
CPC .................. G01N 2015/084; B01D 46/442
See application file for complete search history.

(56) References Cited

U.S. PATENT DOCUMENTS

| | | | |
|---|---|---|---|
| 2017/0189844 A1 | 7/2017 | McLeod et al. | |
| 2018/0073759 A1* | 3/2018 | Zhang .................. | F24F 11/30 |

(Continued)

FOREIGN PATENT DOCUMENTS

| | | |
|---|---|---|
| JP | 2018501457 | 1/2018 |
| KR | 1020040091821 | 11/2004 |
| KR | 1020160027901 | 3/2016 |

(Continued)

OTHER PUBLICATIONS

Korean Intellectual Property Office Application Serial No. 10-2019-0107768, Office Action dated Dec. 14, 2020, 5 pages.

(Continued)

*Primary Examiner* — Eric S. McCall
*Assistant Examiner* — Timothy P Graves
(74) *Attorney, Agent, or Firm* — Lee Hong Degerman Kang & Waimey

(57) ABSTRACT

Disclosed is a method of predicting the lifespan of a filter in an air cleaner based on machine learning. According to an embodiment of the present disclosure, a machine learning-based filter lifespan prediction method may more precisely predict the lifespan of a filter in an air cleaner by inputting fine dust concentration data and a history related to use of the air cleaner to a lifespan prediction model and determining the purifying efficiency and exchange time of the filter according to an output value. Intelligent air cleaner of the present disclosure can be associated with artificial intelligence modules, drones (unmanned aerial vehicles (UAVs)), robots, augmented reality (AR) devices, virtual reality (VR) devices, devices related to 5G service, etc.

17 Claims, 12 Drawing Sheets

(56) References Cited

U.S. PATENT DOCUMENTS

2020/0179857 A1* 6/2020 Delin ................. B01D 46/46
2020/0256578 A1* 8/2020 Meis .................. B01D 46/46

FOREIGN PATENT DOCUMENTS

| KR | 1020180083113 | 7/2018 |
| KR | 1020190037274 | 4/2019 |
| KR | 1020190058106 | 5/2019 |
| WO | 2019046381 | 3/2019 |
| WO | WO-2020064187 A1 * | 4/2020 |

OTHER PUBLICATIONS

Korean Intellectual Property Office Application Serial No. 10-2019-0107768, Notice of Allowance dated Dec. 3, 2021, 2 pages.

\* cited by examiner

METHOD FOR PREDICTING FILTER PURIFYING EFFICIENCY AND EXCHANGE TIME USING MACHINE LEARNING

CROSS-REFERENCE TO RELATED APPLICATION(S)

Pursuant to 35 U.S.C. § 119(a), this application claims the benefit of earlier filing date and right of priority to Korean Patent Application No. 10-2019-0107768, filed on Aug. 30, 2019, the contents of which are all hereby incorporated by reference herein in its entirety.

TECHNICAL FIELD

Embodiments of the present disclosure relates to a method for predicting the lifespan of a filter in an air cleaner based on machine learning, and more specifically, to a method for predicting the lifespan of a filter in an air cleaner based on machine learning, which may precisely predict the lifespan of the filter.

DESCRIPTION OF RELATED ART

An artificial intelligence system implementing human-level intelligence has been used in various fields. The artificial intelligence system is a system in which a machine performs learning and decision and becomes smart by itself unlike an existing rule-based smart system. As the artificial intelligence system is used more, a recognition rate is improved and a user's taste may be more accurately understood, such that the existing rule-based smart system has been gradually replaced by a deep learning-based artificial intelligence system.

An artificial intelligence technology may include machine learning (for example, deep learning) and element technologies using the machine learning Machine learning is an algorithm technique that it itself may classify and learn the features of input data. The component technology is a technique for mimicking the human brain's perception and decision capabilities using a machine learning algorithm (e.g., deep learning), and this may be divided into several technical fields, such as linguistic understanding, visual understanding, inference/prediction, knowledge expression, and operation control.

The following are examples of AI applications. Linguistic understanding is technology for recognizing and applying/processing a human being's language or text, and this encompasses natural language processing, machine translation, dialog system, answering inquiries, and speech recognition/synthesis. Visual understanding is a technique of perceiving and processing things as do human eyes, and this encompasses object recognition, object tracing, image search, human recognition, scene recognition, space understanding, and image enhancement. Inference prediction is a technique of determining and logically inferring and predicting information, encompassing knowledge/probability-based inference, optimization prediction, preference-based planning, and recommendation. Knowledge expression is a technique of automatically processing human experience information, covering knowledge buildup (data production/classification) and knowledge management (data utilization). Operation control is a technique of controlling the motion of robots and driverless car driving, and this encompasses movement control (navigation, collision, driving) and maneuvering control (behavior control).

In an air cleaner, a filter is an essential component and the purifying efficiency of the air cleaner depends on how old the filter is. There is no way for predicting the lifespan of the air cleaner and, thus, the user feels uncomfortable.

SUMMARY

The present disclosure aims to address the foregoing issues and/or needs.

The present disclosure aims to implement a method for more precisely predicting the lifespan of a filter of an air cleaner based on machine learning.

Another object of the present disclosure is to implement an intelligent air cleaner capable of determining the exchange time of the filter and, when the exchange time has elapsed, reduce power consumption of the air cleaner.

Still another object of the present disclosure is to implement an intelligent air cleaner capable of transmitting information regarding the filter purifying efficiency and exchange time to another electronic device of the user.

According to an embodiment of the present disclosure, a method for predicting a lifespan of a filter in an air cleaner comprises obtaining first fine dust concentration data via a sensor, receiving second fine dust concentration data from an external server, searching a memory for a history related to use of the air cleaner, and inputting the first fine dust concentration data and the second fine dust concentration data and the history related to use of the air cleaner to a lifespan prediction model and determining a purifying efficiency and exchange time of the filter according to an output value, wherein the first fine dust concentration data includes a fine dust concentration of a space where the air cleaner is placed, and the second fine dust concentration data may include an outdoor fine dust concentration in an area where the air cleaner is located.

The first fine dust concentration data may include at least one of an indoor fine dust concentration before operation or an indoor fine dust concentration after operation.

The history related to use of the air cleaner may include at least one of a user history, an exchange cycle of the filter, or an operation time after the filter is exchanged.

The lifespan prediction model may be an artificial neural network model previously trained, with the exchange time of the filter set as training data. The exchange time of the filter may be varied depending on the history related to use of the air cleaner and the fine dust concentration.

Information regarding the exchange time may further include a remaining lifespan of the filter of the air cleaner.

The method may further comprise displaying information regarding the exchange time of the filter via a display.

Displaying the information regarding the exchange time of the filter may include displaying a state of the filter in a different color depending on a remaining lifespan of the filter.

The method may further comprise when the filter is not exchanged at the exchange time of the filter, measuring a variation in the fine dust concentration while operating the air cleaner. When the variation in the fine dust concentration is less than a preset threshold, the operation of the air cleaner may be stopped.

Determining the purifying efficiency and exchange time of the filter may include extracting a feature from the history related to use of the air cleaner and the first fine dust concentration data and the second fine dust concentration data, inputting the feature to the lifespan prediction model pre-trained, and determining the purifying efficiency and exchange time of the filter according to an output of the lifespan prediction model.

The method may further comprise controlling a communication interface to transmit the history related to use of the air cleaner and the first fine dust concentration data and the second fine dust concentration data for the air cleaner to an artificial intelligence (AI) processor included in a five-generation (5G) network and controlling the communication interface to receive AI-processed information from the AI processor. The AI-processed information may include the purifying efficiency and exchange time of the filter.

According to an embodiment of the present disclosure, an intelligent air cleaner comprises a sensor obtaining first fine dust concentration data, a communication interface receiving second fine dust concentration data from an external server, and a processor searching for a history related to use of the air cleaner, inputting the first fine dust concentration data and the second fine dust concentration data and the history related to use of the air cleaner to a lifespan prediction model, and determining a purifying efficiency and exchange time of a filter according to an output value, wherein the first fine dust concentration data includes a fine dust concentration of a space where the air cleaner is placed, and the second fine dust concentration data includes an outdoor fine dust concentration in an area where the air cleaner is located.

According to an embodiment, a method for predicting the lifespan of a filter in an air cleaner based on machine learning presents the following effects.

The present disclosure may more precisely predict the lifespan of the filter.

The present disclosure may determine the exchange time of the filter and, when the exchange time elapses, reduce power consumption of the air cleaner.

The present disclosure may transmit information regarding the purifying efficiency and exchange time of the filter to another electronic device.

Effects of the present disclosure are not limited to the foregoing, and other unmentioned effects would be apparent to one of ordinary skill in the art from the following description.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

A more complete appreciation of the present disclosure and many of the attendant aspects thereof will be readily obtained as the same becomes better understood by reference to the following detailed description when considered in connection with the accompanying drawings, wherein:

DETAILED DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
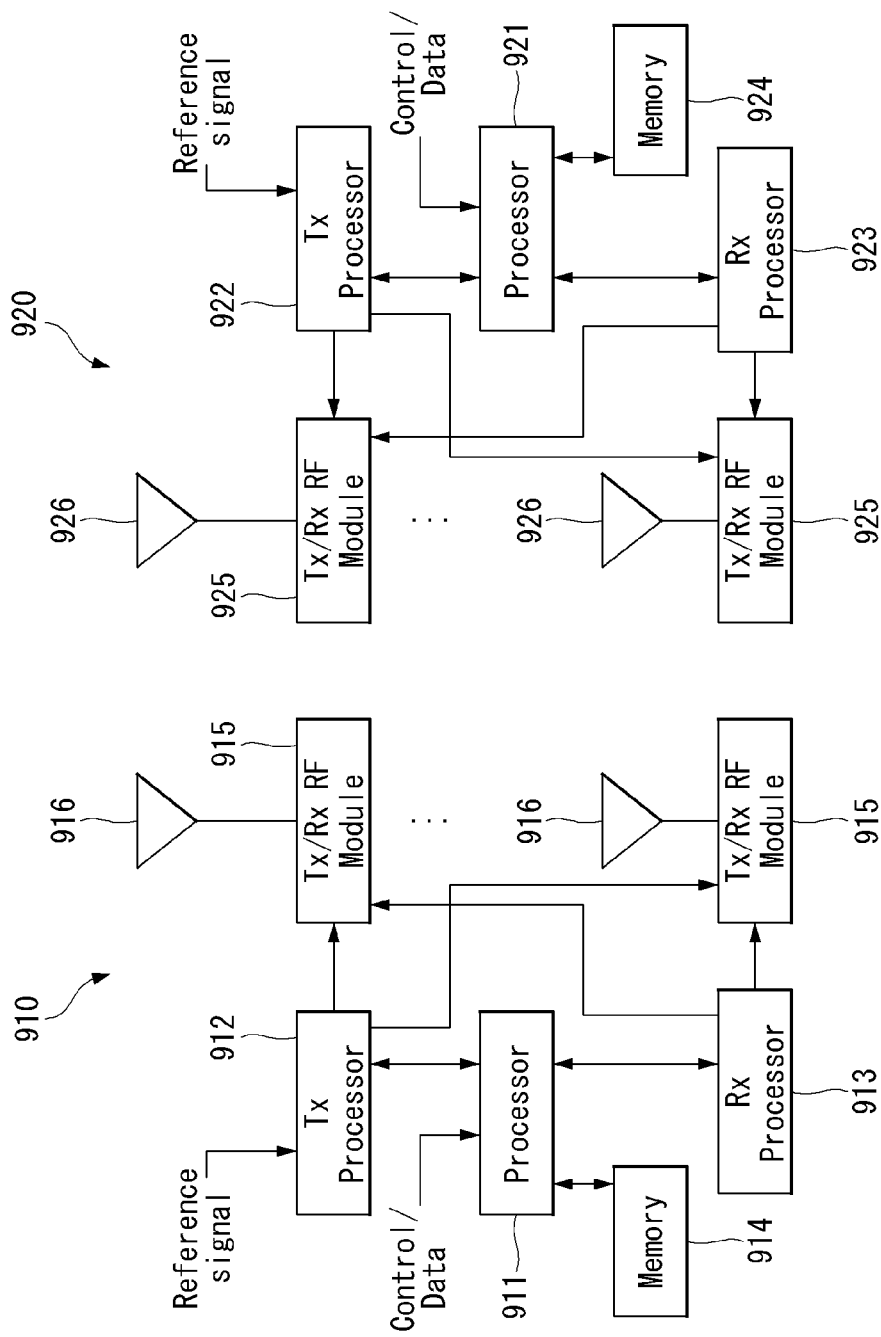
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device(AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
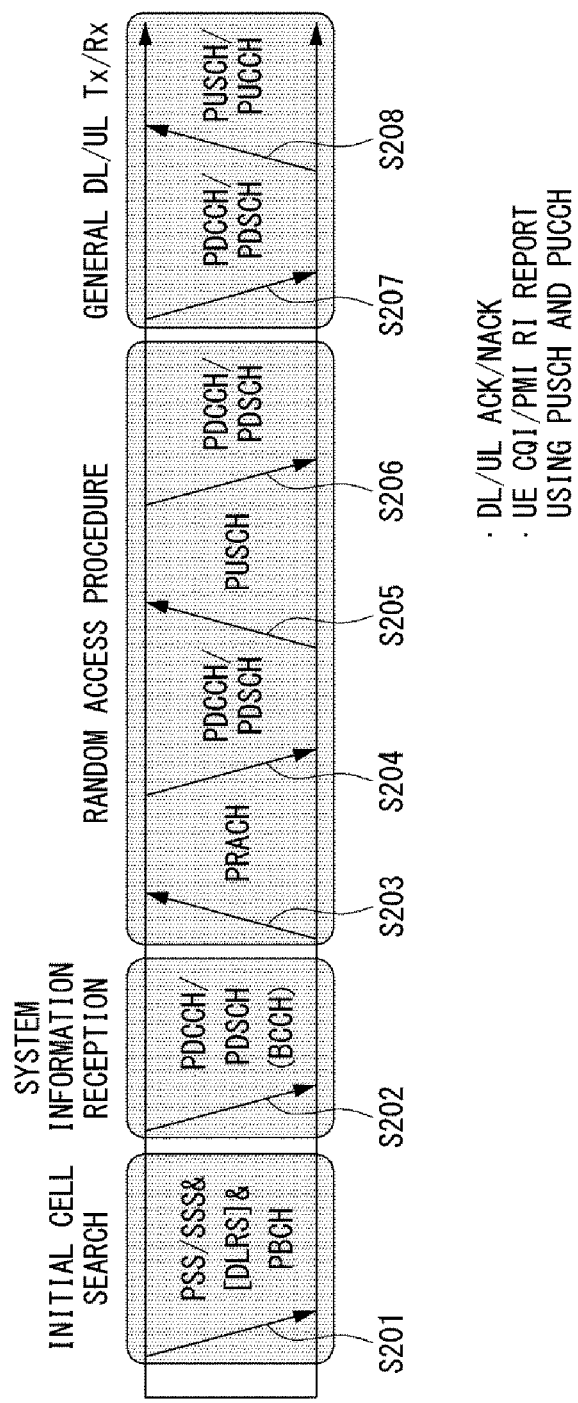
FIG. 2 shows an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.
- When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3)

extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

Figure 3:
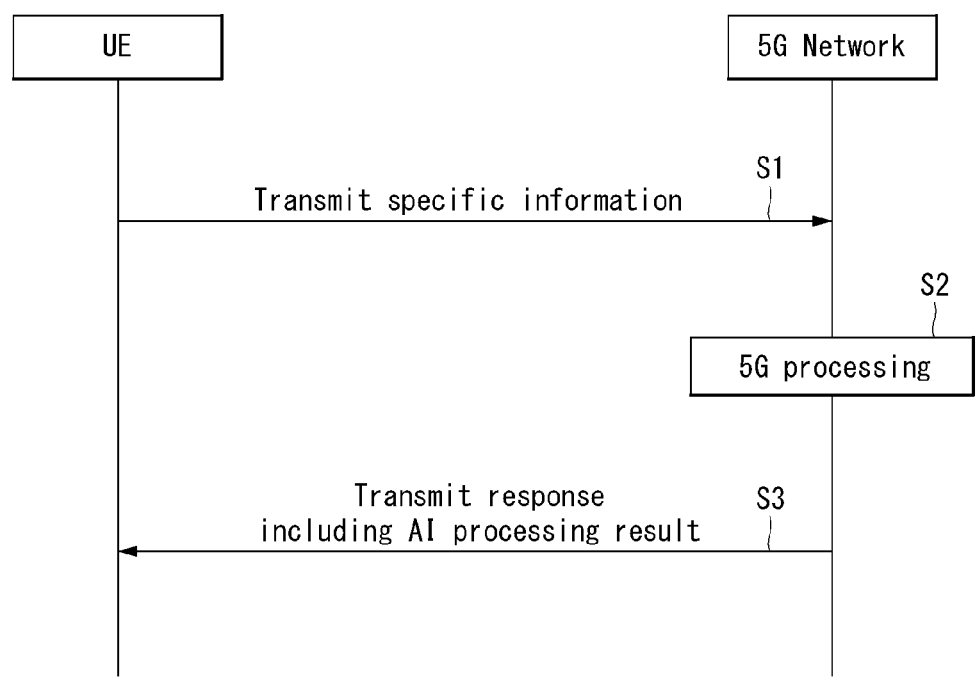
FIG. 3 shows an example of basic operations of an user equipment and a 5G network in a 5G communication system.

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE (S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols)

indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

AI Device Block

Figure 4:
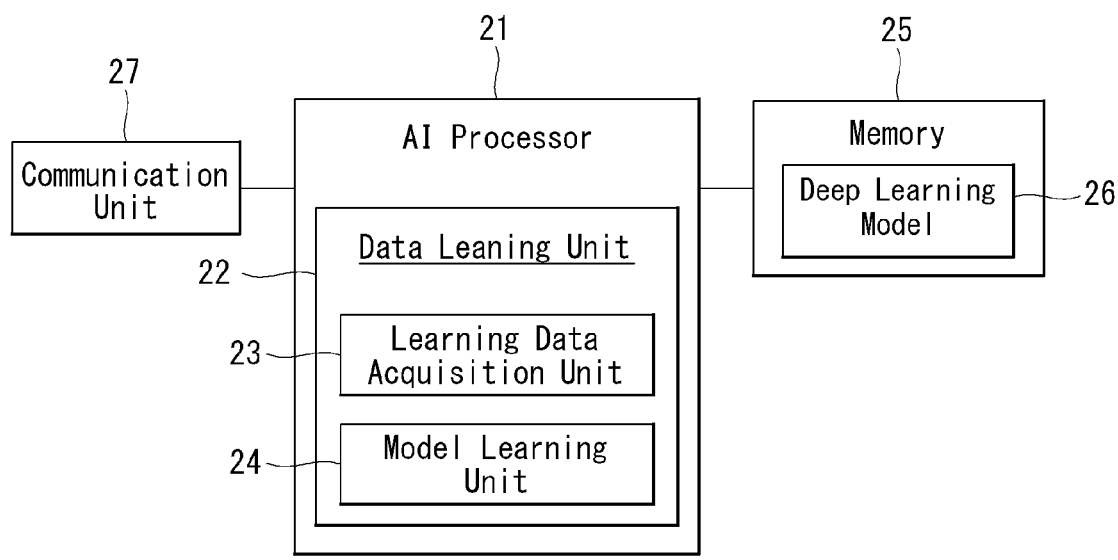
FIG. 4 is a block diagram of an AI device according to an embodiment of the present disclosure.

FIG. 4 is a block diagram of an AI device according to an embodiment of the present disclosure.

An AI device 20 may include an electronic device including an AI module that can perform AI processing, a server including the AI module, or the like. Further, the AI device 20 may be included as at least one component of the vehicle 10 shown in FIG. 1 to perform together at least a portion of the AI processing.

The AI processing may include all operations related to driving of the vehicle 10 shown in FIG. 4. For example, an autonomous vehicle can perform operations of processing/determining, and control signal generating by performing AI processing on sensing data or driver data. Further, for example, an autonomous vehicle can perform autonomous driving control by performing AI processing on data acquired through interaction with other electronic devices included in the vehicle.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to vehicles. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 4 was functionally separately described into the AI processor 21, the memory 25, the communication unit 27, etc., but it should be noted that the aforementioned components may be integrated in one module and referred to as an AI module.

Figure 5:
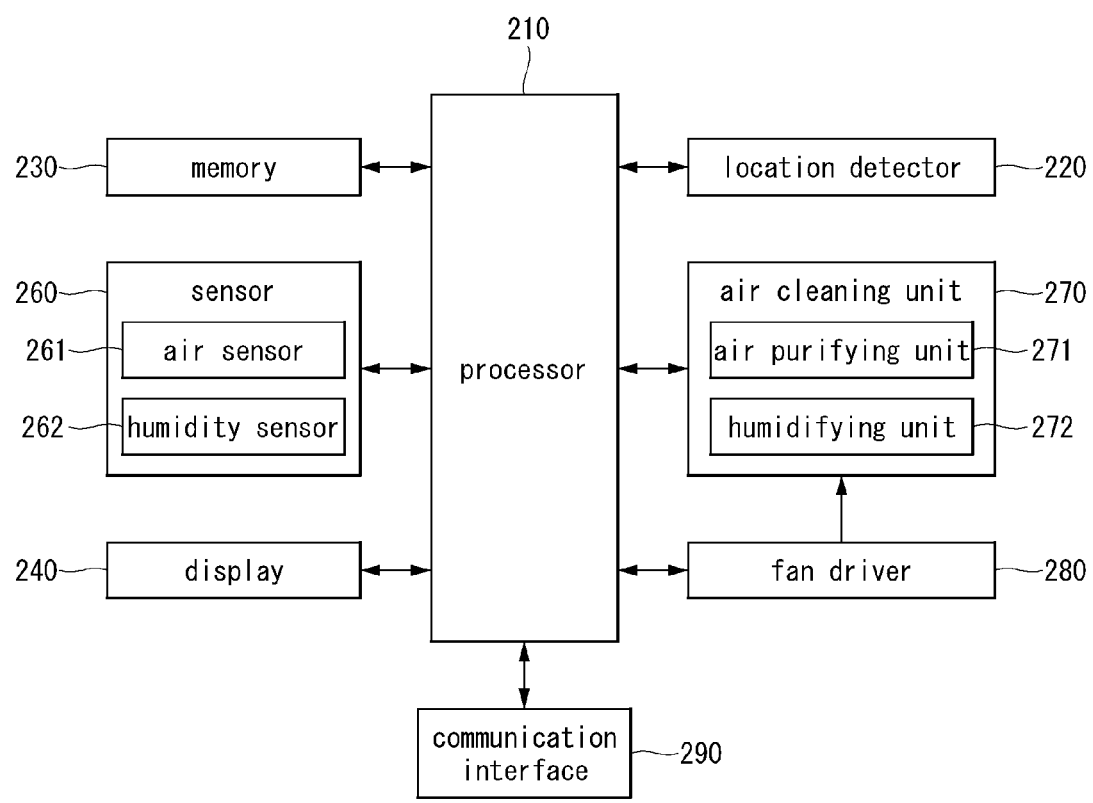
FIG. 5 is a block diagram illustrating a configuration of an air cleaner according to an embodiment of the present disclosure.

FIG. 5 is a block diagram illustrating a configuration of an air cleaner 10 according to an embodiment of the present disclosure.

Referring to FIG. 5, according to an embodiment of the present disclosure, an air cleaner 10 includes a processor 210, a sensor 260, an air cleaning unit 270, and a communication interface 290.

The processor 210 controls the overall configuration and operation of the air cleaner 10. The processor 210 may calculate the air cleanliness based on a sensing value obtained from the sensor 260 and may further calculate additional information, e.g., humidity. The air cleanliness represents how clean the air is and may be shown as a value which is in inverse proportion to fine dust or harmful materials in the air. The processor 210 may control a pen driver 280 and the air cleaning unit 270 to purify the air.

The processor 210 may perform functions of a server 100. In other words, when at least any one of the air cleanliness of a first area (also referred to as a first air cleanliness) or the air cleanliness of a second area adjacent to the first area (also referred to as a second air cleanliness) is a preset threshold or less, the processor 210 may operate the air purifying unit while varying the operation mode every predetermined time.

The processor 210 may monitor variations in the first and second air cleanliness every predetermined time and obtain weights which are proportional to the variations in the first and second air cleanliness.

The processor 210 may distribute a total weight, which is preset in proportion to the variations in the air cleanliness, to operation modes of the air cleaner 10, thereby obtaining a weight for each operation mode and setting the operation mode with the largest weight as the optimal operation mode.

When the variations in the first and second air cleanliness are less than a preset variation expectancy while the air cleaner 10 is operated in the optimal operation mode, the processor 210 may update the optimal operation mode.

The processor 210 may store a use history of the air cleaner 10, including the user's turning on and off the air cleaner 10 and changing the operation mode, in a memory. Whenever the user exchanges the filter of the air cleaner 10, the processor 210 may identify whether the filter is exchanged via a sensor positioned in a filter container (not shown).

Whenever the user exchanges the filter, the processor 210 may calculate the exchange cycle of the filter and store the calculated filter exchange cycle in the memory. The processor 210 may store the purifying efficiency of the air cleaner 10 at the time of exchanging the filter, along with the exchange cycle of the filter.

The processor 210 may input first fine dust concentration data obtained via the sensor 260, second fine dust concentration data received from an external server, and a history related to use of the air cleaner 10, which is stored in a memory 230, to a lifespan prediction model and determine the exchange time of the filter depending on an output value. The first fine dust concentration data denotes the fine dust concentration in the space where the air cleaner 10 is placed, and the second fine dust concentration data denotes the fine dust concentration in a particular area where the air cleaner 10 is located. The first fine dust concentration data may include at least one of an indoor fine dust concentration before operation or an indoor fine dust concentration after operation. The history related to use of the air cleaner 10 may include at least one of the use history of the air cleaner 10, the exchange cycle of the filter, and the operation time after the filter is exchanged.

The lifespan prediction model may be an artificial neural network model previously trained, with the exchange time of the filter, which is varied depending on the history related to use of the air cleaner and the fine dust concentration, set as training data. The lifespan prediction model may extract feature information from the above-described input data and elicit an output value via computation at each node of the artificial neural network.

The processor 210 may determine the state of the air cleaner 10 according to the output value of the lifespan prediction model. Specifically, the processor 210 may determine the current air purifying efficiency of the filter, the remaining use time (remaining lifespan) of the filter, and the scheduled exchange time of the filter depending on the output value.

The processor 210 may generate information regarding the filter exchange time. The filter exchange time information may include at least one of the current air purifying efficiency of the air cleaner 10, the remaining use time of the filter, or the scheduled exchange time of the filter.

When the filter is not exchanged at the filter exchange time, the processor 210 may measure the variation in the fine dust concentration of the air cleaner 10 and, when the variation in the fine dust concentration is less than a preset threshold, stop operating the air cleaner 10. When the filter exchange is not done properly at the filter exchange time, it is hard to obtain the user's desired air purifying efficiency although the air cleaner 10 runs. Thus, power consumption may be saved by stopping the operation of the air cleaner 10.

At least one or more location detectors 220 may be provided on the front (and/or side or back surface) of the air cleaner 10. The location detector 220 may detect, e.g., information about the current location of the air cleaner 10. The location information may be represented with, e.g., coordinates of the location of the air cleaner 10 in the area.

The memory 230 may store sensing data obtained via the sensor 260 and the use history of the air cleaner 10. Specifically, the sensing data may include indoor fine dust concentration data. The use history may include, e.g., the variation history of the operation mode and use time of the air cleaner 10, and the average quantity of dust caused indoors. The memory 230 may also include the user's filter exchange history. The filter exchange history information may include information about the purifying efficiency at which the user has exchanged filters.

A display 240, as a means for displaying the air condition and/or the level of the air cleaning operation, may display the exchange time of the filter. The display 240 may display a different color depending on the remaining time of the filter based on the filter exchange time information. Displaying a different color depending on the remaining time of the filter allows the user to more easily recognize the condition and exchange time of the filter.

The sensor 260 may detect the air condition and, to that end, may include an air sensor 261 and a humidity sensor 262. The air sensor 261 detects fine dust and harmful particles in the air. The humidity sensor 262 senses the humidity of the air.

The air cleaning unit 270 may perform the functions of cleaning and humidifying the air. To that end, the air cleaning unit 270 may include an air purifying unit 271 and a humidifying unit 272.

The air purifying unit 271 functions to purify the air according to control signals. The air purifying unit 271 may come in various types, e.g., a filter type, an ionizer type, an electric duct collector type, or a water filter type.

The filter type sucks in the air by a fan as in an electric fan or air conditioner, purifies the air via a filter, and discharges the purified air. Adopting this type, the air cleaner 10 typically collects and filters fine particles by using a high-efficiency particulate air (HEPA) filter formed of dense unwoven fabric and adsorbs smells by activated carbon. The electric dust collector type may be used together which takes advantage of the 'plasma effect' as an electric discharge effect. Besides, the air cleaner 10 may also adopt an optical catalyst or an ultra-low particulate air (ULPA) filter which may remove smaller particles than the HEPA does.

The ionizer type applies a high voltage to two electrodes spaced apart at a distance to discharge ions in the air and allow the ions to stick to airborne fine particles and attract them to a positive-pole dust collecting plate, thereby removing the particles.

The electric dust collector type makes use of the electric discharge principle as the ionizer type does, and this type may purify polluted air with a powerful dust collecting plate. The electric dust collector type typically uses a fan unlike the ionizer type.

The water filter type uses water as a filter and removes contaminants by the adsorbability of water. The water filter type may raise adsorbability by adding an electrical property to water or may filter out dust by passing the dust-containing air through water.

The humidifying unit 272 humidifies the air depending on the air humidity obtained via the humidity sensor 262.

The fan driver 280 drives a fan included in the air purifying unit 271 of, e.g., the filter type.

The communication interface 290 may include a component for receiving signals/data from an external device and may further include a wireless communication module (not shown) for wireless communication, a tuner (not shown) for tuning broadcast signals, or other various additional components. Not only does the communication interface 290 receive signals from the external device, but the communication interface 290 may also transmit information/data/signals of the air cleaner 10 to the external device. In other words, the communication interface 290 is not limited as including the component for receiving signals from the external device, but the communication interface 290 may rather be implemented as a bi-directional communication-enabled interface. The communication interface 290 may receive a control signal for selecting a user interface (UI) from a plurality of control devices. The communication interface 290 may be configured as a communication module for Wi-Fi, Bluetooth, infrared radiation (IR), ultra-wideband (UWB), Zigbee, or other know short-range wireless communication or as a mobile communication module, such as for 3G, 4G, LTE, or 5G, or the communication interface 180 may alternatively be configured as a known communication port for wired communication. The communication interface 290 may be used for various purposes, such as, e.g., of transmission/reception of data and commands for controlling the display, as well as the control signal for selecting the UI.

Figure 6:
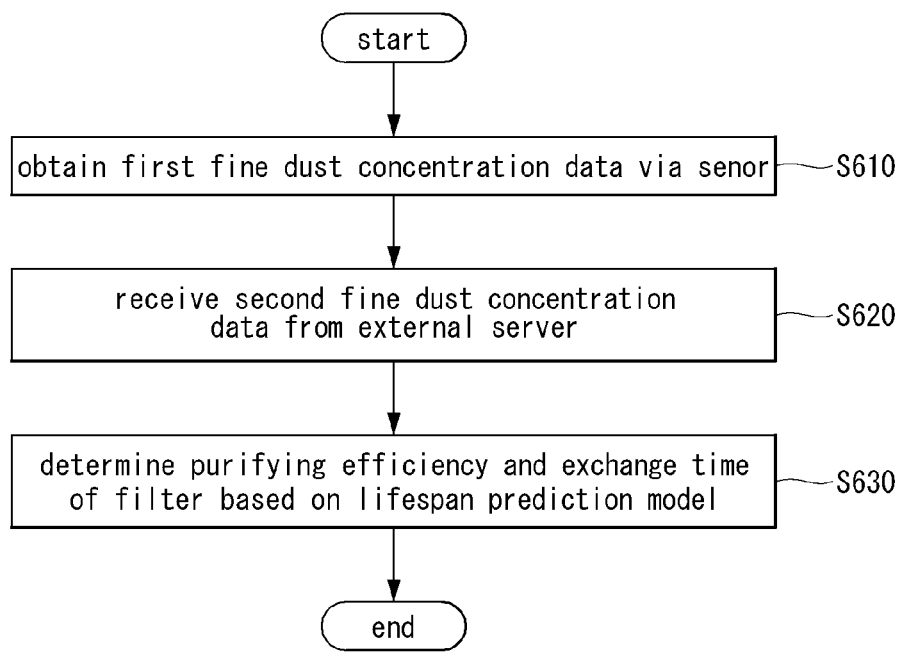
FIG. 6 is a flowchart illustrating a method for predicting the lifespan of a filter according to an embodiment of the present disclosure.

FIG. 6 is a flowchart illustrating a method for predicting the lifespan of a filter according to an embodiment of the present disclosure.

Referring to FIG. 6, the air cleaner 10 may obtain fine dust concentration data via the sensor 260 (S610).

The fine dust concentration data may include a fine dust concentration before operating the air cleaner 10 and a fine dust concentration after operating the air cleaner 10. The fine dust concentration data may include data regarding the degree of air quality enhanced by the air cleaner 10 operated during a particular period. The data regarding the enhanced degree of air quality may include first enhancement information regarding the degree of enhancement by the air cleaner 10 for a short period and second enhancement information regarding the degree of enhancement by the air cleaner 10 during a long period. The second enhancement information may be the mean of variations in the fine dust concentration which have been made as the air cleaner 10 is operated during the long period.

The air cleaner 10 may receive fine dust concentration data for a particular area from an external server through the communication interface (S620).

The degree of contamination of the filter of the air cleaner 10 may differ depending on the air quality of the particular area where the air cleaner 10 is located as well as the space in which the air cleaner 10 is placed. Thus, the lifespan of the filter may be predicted more specifically by receiving the fine dust concentration data for the particular area. The air cleaner 10 may send a request for the fine dust concentration data for the particular area to the external server and, in response to the request, the external server may gather and transfer the fine dust concentration data for the particular area via the Web. The air cleaner 10 may transmit location information generated by the location detector along with the request for the fine dust concentration data. This leads to more precise prediction of the filter lifespan and air purifying efficiency.

The processor 210 may determine the purifying efficiency and exchange time of the filter based on a lifespan prediction model (S630).

The lifespan prediction model may be an artificial neural network model previously trained, with the exchange time of the filter, which is varied depending on the history related to use of the air cleaner and the fine dust concentration, set as training data. In this case, the user-adapted output value may be elicited by setting the user-related history as training data. In particular, the filter air purifying efficiency and exchange time may differ depending on the user of the air cleaner 10. Thus, according to an embodiment of the present disclosure, the air cleaner 10 may analyze whether the user exchanges the filter in a particular air purifying efficiency, thereby predicting the filter exchange time in a more accurate manner.

According to an embodiment of the present disclosure, the training data of the lifespan prediction model of the air cleaner 10 may be more intensively learned by giving a reward based on the user's reaction for the filter purifying efficiency and exchange time predicted via AI processing.

The filter purifying efficiency may be calculated by comparing the fine dust concentration at the time of operation of the air cleaner 10 with the fine dust concentration a particular time thereafter. The air purifying efficiency of the filter may include an initial air purifying efficiency and a current air purifying efficiency. According to an embodiment of the present disclosure, the processor 210 may control the display 240 to display a different color depending on the air purifying efficiency of the filter.

The information regarding the filter exchange time may include a scheduled exchange time and remaining lifespan of the filter. The processor 210 may display the remaining lifespan of the filter via the display 240 of the air cleaner 10. According to an embodiment of the present disclosure, the display 240 may display the remaining lifespan in day units.

Figure 7:
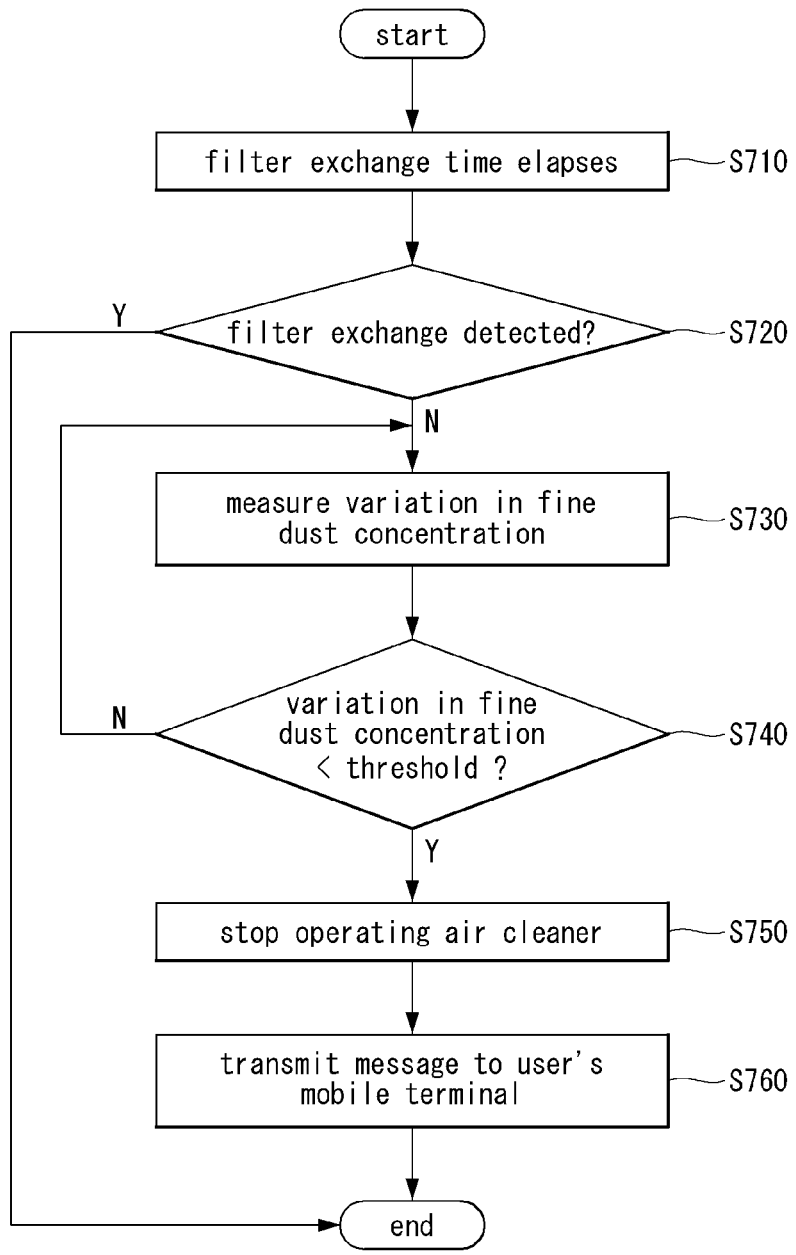
FIG. 7 is a flowchart illustrating the step of stopping an air cleaner with a filter whose exchange time has elapsed.

FIG. 7 is a flowchart illustrating the step of stopping an air cleaner 10 with a filter whose exchange time has elapsed.

Specifically, FIG. 7 illustrates the step of stopping the air cleaner 10 when the user does not exchange the filter at the filter exchange time determined in the step described above in connection with FIG. 6.

The processor 210 may compare the current time with the filter exchange time determined in the step described above in connection with FIG. 6, thereby determining whether the filter exchange time has elapsed (S710).

The processor 210 may steadily send a request for current time information to the external server and, in response, the external server may transmit time information.

The processor 210 may detect whether the filter is exchanged (S720).

The processor 210 may determine whether the filter is exchanged based on filter exchange information obtained via a pressure sensor as the sensor provided in the filter container. Specifically, in the case of exchanging the filter, a pressure may be produced by the user's action of exchanging the filter, and the sensor may determine whether the filter is exchanged based on the pressure data.

Alternatively, the processor 210 may determine whether the filter is exchanged based on the air purifying efficiency. When exchanged with a new filter, the air purifying efficiency is expected to get better as compared with before exchanged. Thus, the processor 210 may compare a variation in the air purifying efficiency during a particular time after operating the air cleaner 10 and, if the variation in the air purifying efficiency is less than a preset threshold, determine that the filter has not been exchanged.

The above-described step of detecting whether the filter is exchanged or not may be performed depending on whether a filter door provided outside of the filter container is open. Generally, the filter door is not open except for when exchanging or identifying the filter. Identifying whether the filter is exchanged whenever opening the filter door may reduce unnecessary processing.

Unless a filter exchange is detected, the processor 210 may measure again the variation in the fine dust concentration (S730).

The processor 210 may operate the air cleaner 10 during a particular time and measure the variation in the fine dust concentration. The particular time may be preset by the user.

The processor 210 may compare the fine dust concentration variation with a preset threshold (S740).

When the fine dust concentration variation is less than the preset threshold, the processor 210 may stop operating the air cleaner 10 (S750).

Upon stopping the operation of the air cleaner 10, the processor 210 may transmit a message for requesting to exchange the filter to the user's mobile terminal connected via communication with the air cleaner 10 (S760).

Figure 12:
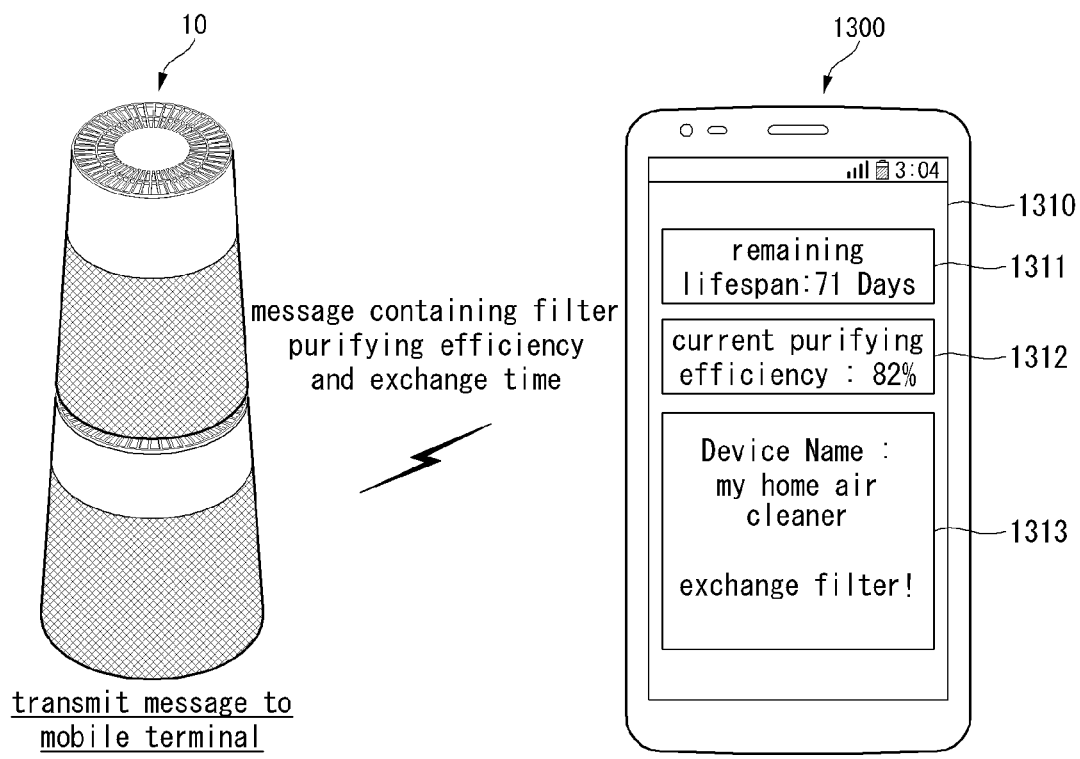
FIG. 12 is a view illustrating an example of transmitting a message to a user's mobile terminal when the exchange time of a filter elapses.

The message for requesting to exchange the filter may include the exchange time and remaining lifespan of the filter, the current air purifying efficiency, and text for requesting to exchange the filter (refer to FIG. 12).

The above-described steps of stopping the operation of the air cleaner 10 and transmitting the message for requesting to exchange the filter are not limited to a particular order. For example, the processor 210 may stop operating the air cleaner 10 after transmitting the message for requesting to exchange the filter to the user's mobile terminal connected via communication with the air cleaner 10

Figure 8:
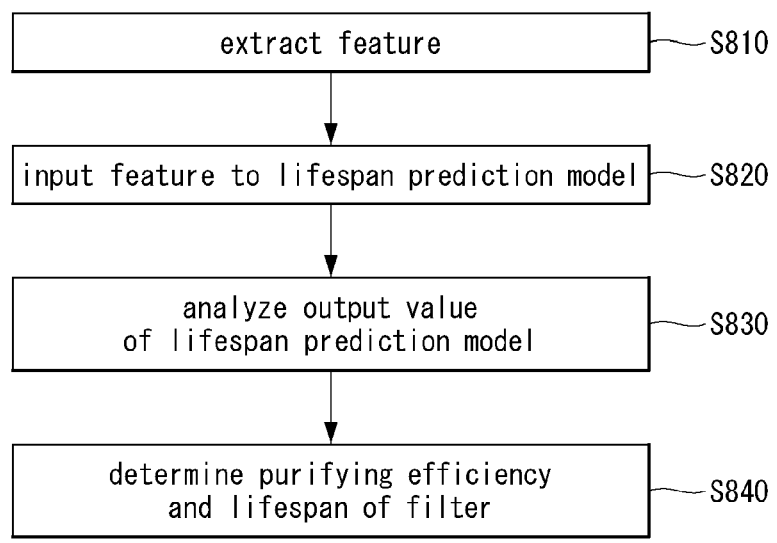
FIG. 8 is a flowchart illustrating an example of performing the filter lifespan prediction method of FIG. 6 via AI processing.

FIG. 8 is a flowchart illustrating an example of performing the filter lifespan prediction method of FIG. 6 via AI processing.

Referring to FIG. 8, the air cleaner 10 may extract a feature from first and second fine dust concentration data and a history related to use of the air cleaner 10 (S810).

The air cleaner 10 may input the extracted feature to a pre-trained artificial neural network (ANN) model (S820).

The ANN model may be previously trained to be able to receive the feature extracted from the first and second fine dust concentration data and the history related to use of the air cleaner 10 and generate filter purifying efficiency and exchange time information as an output.

The air cleaner 10 may analyze the output value of the ANN (S830).

The air cleaner 10 may determine the purifying efficiency and remaining lifespan of the filter for precisely predicting the lifespan of the filter in the air cleaner 10 based on the output value of the ANN (S840).

Figure 9:
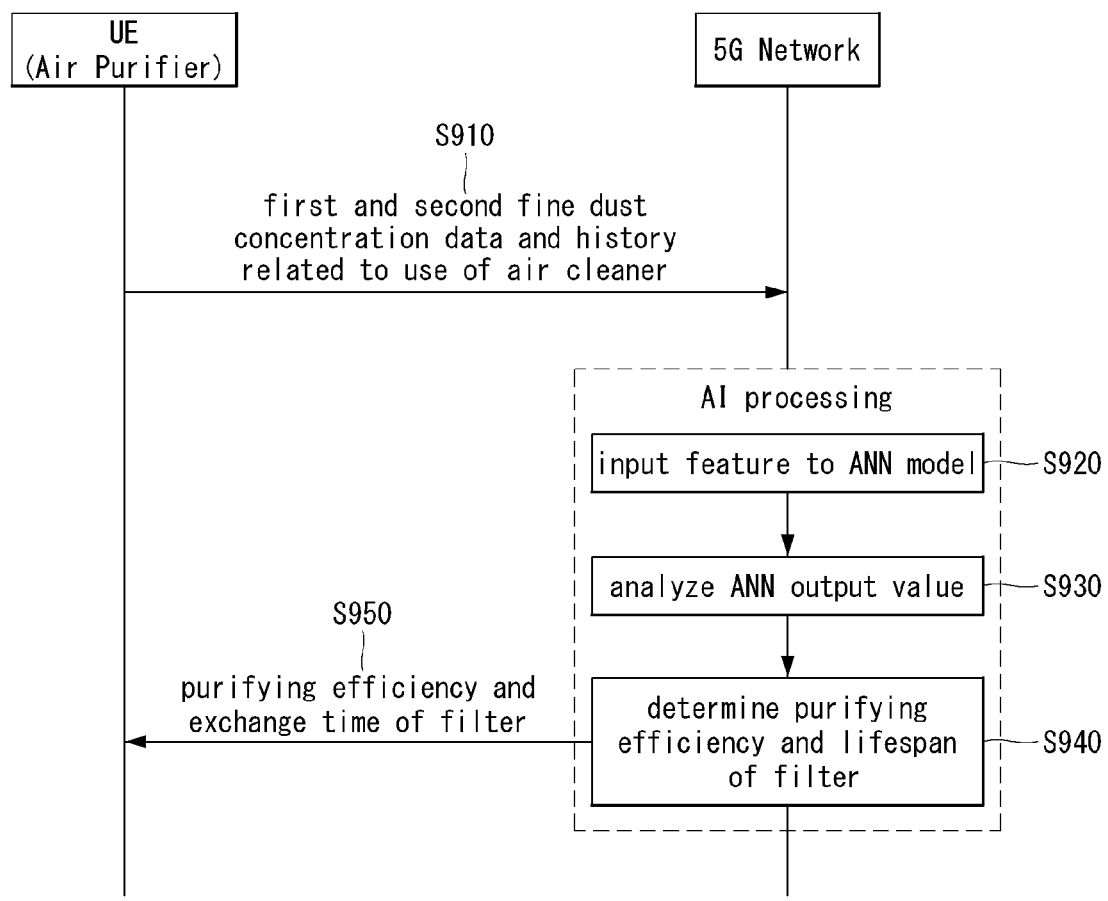
FIG. 9 is a flowchart illustrating an example of performing the filter lifespan prediction method of FIG. 6 via AI processing of a 5G network.

FIG. 9 is a flowchart illustrating an example of performing the filter lifespan prediction method of FIG. 6 via AI processing of a 5G network.

Referring to FIG. 9, the processor 210 of the air cleaner 10 may control the communication interface to transmit the first and second fine dust concentration data for the air cleaner 10 and the history related to use of the air cleaner 10 to an AI processor included in a 5G network. The processor 210 may control the communication interface to receive the AI-processed information from the AI processor.

The air cleaner 10 may perform an initial access procedure with the 5G network to transmit the first and second fine dust concentration data for the air cleaner 10 and the history related to use of the air cleaner 10 to the 5G network. The air cleaner 10 may perform the initial access procedure with the 5G network based on a synchronization signal block (SSB).

The air cleaner 10 may receive, from the network through the communication interface 290, downlink control information (DCI) used for schedule transmission of the history related to use of the air cleaner 10 and the first and second fine dust concentration data obtained from at least one sensor included in the air cleaner 10.

The processor 210 may transmit air cleanliness information to the network based on the DCI.

The air cleanliness information may be transmitted to the network via a physical uplink shared channel (PUSCH), and the DM-RSs of the synchronization signal block (SSB) and PUSCH may be quasi co-located (QCL) for QCL type D.

Referring to FIG. 9, the air cleaner 10 may transmit the first and second fine dust concentration data, the history related to use of the air cleaner 10, or the feature extracted from the first and second fine dust concentration data and history related to use of the air cleaner 10 to the 5G network (S910).

The 5G network may include an AI processor or an AI system, and the AI system of the 5G network may perform AI processing based on the received sensing information (S920).

The AI system may input features received from the air cleaner 10 to the ANN model (S930). The AI system may analyze the ANN output value and calculate the weight from the ANN output value (S940). The 5G network may generate and update the purifying efficiency and remaining lifespan information for the filter based on the calculated weight (S950).

Albeit described to be performed by the server or AI processor above in connection with FIG. 9, the operations may also be performed by the processor 210 of the air cleaner 10.

Figure 10:
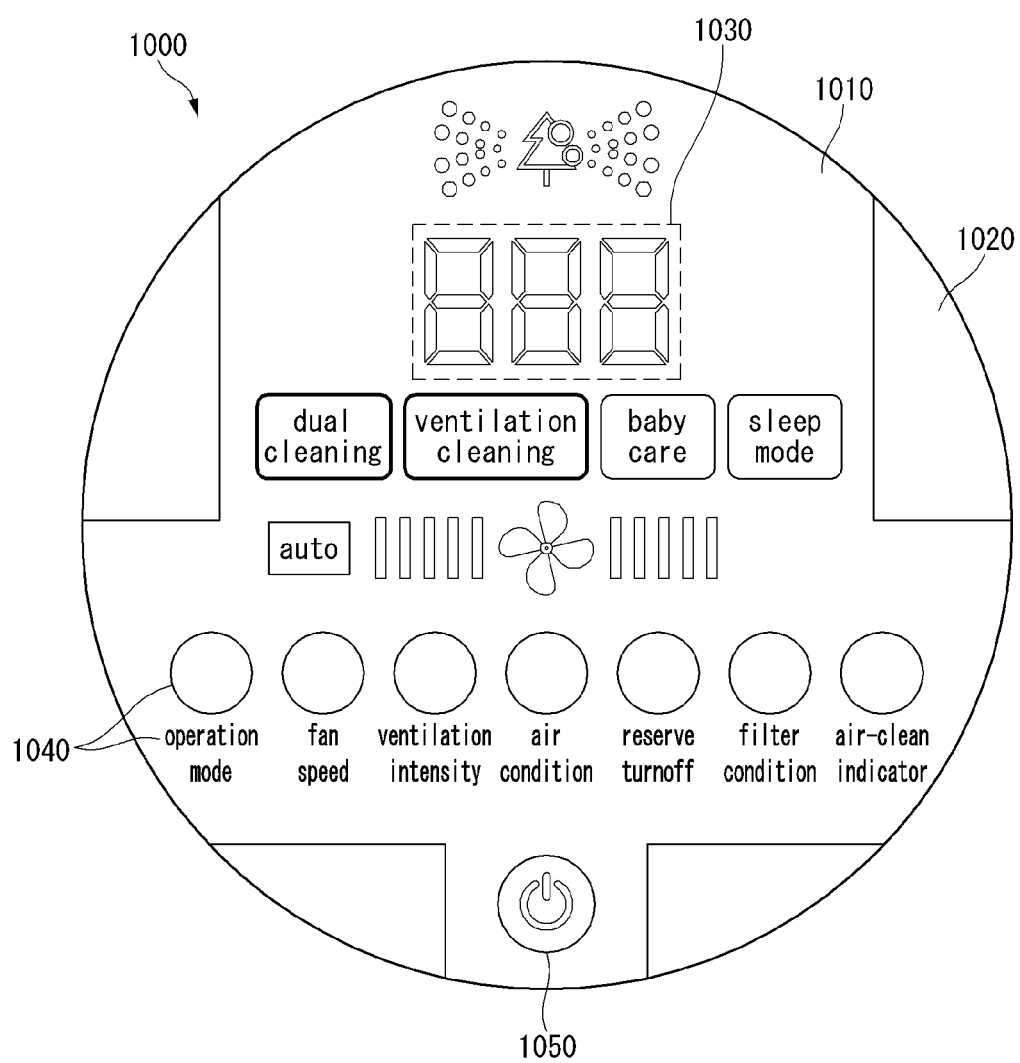
FIG. 10 is a top view of a display included in an air cleaner according to an embodiment of the present disclosure.
Figure 11:
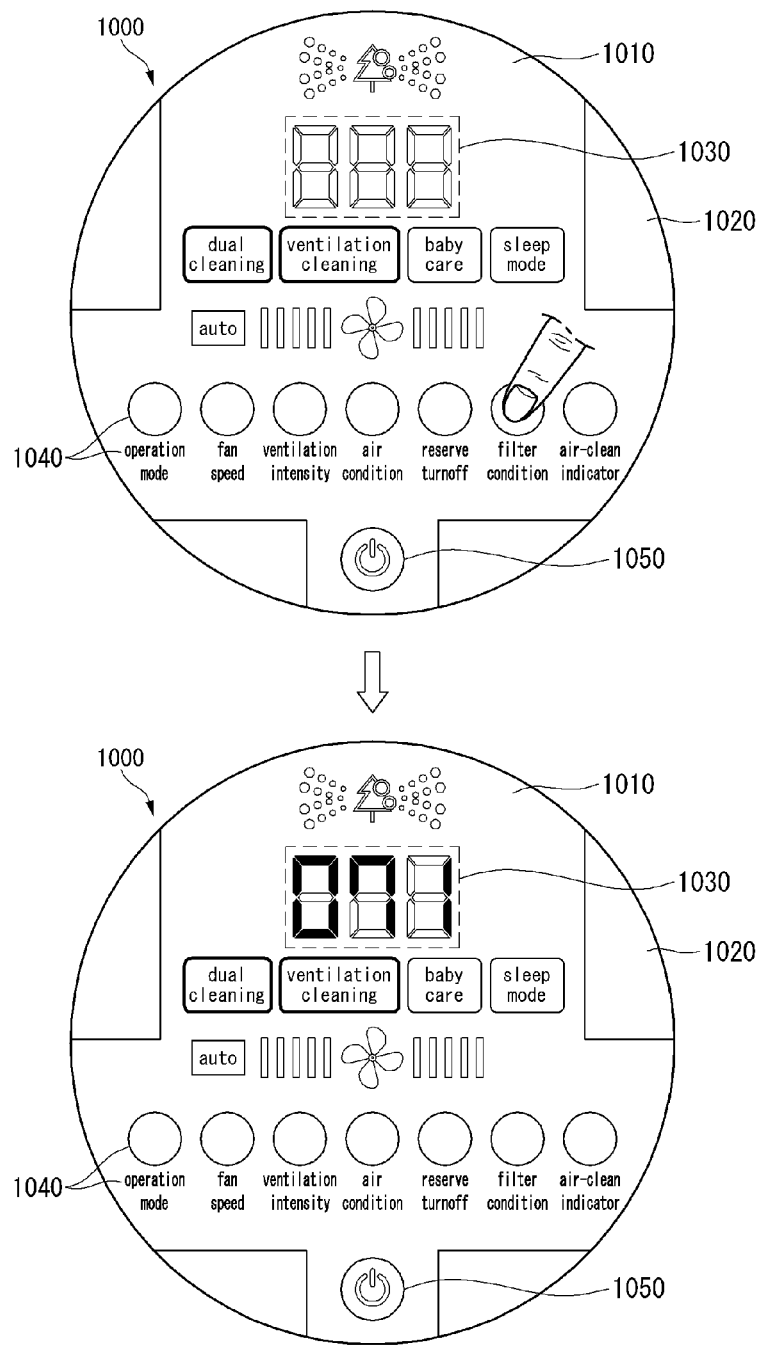
FIG. 11 is a view illustrating an example of displaying the lifespan of a filter according to an embodiment of the present disclosure.

FIG. 10 is a top view of the display 240 provided in the air cleaner 10 according to an embodiment of the present disclosure. FIG. 11 illustrates an example of displaying the lifespan of the filter according to an embodiment of the present disclosure.

Referring to FIG. 10, according to an embodiment of the present disclosure, the display 240 may be installed at the top of the air cleaner 10. The display screen 1010 of the display 240 may configure at least part of the top surface of the air cleaner 10.

The display 240 may include a display cover. The display cover may be appreciated as a component to keep a cover film flat. The display cover may be formed of an opaque material that may block light transmission.

The cover film may be provided on the display cover. The cover film may be formed of a semi-transparent material. The semi-transparent material may include an acrylic or polymethyl methacrylate (PMMA) resin. The cover film may prevent glare from information displayed on the display 240.

The cover film includes a film display 1040 for receiving predetermined commands from the user or displaying some of multiple pieces of operation information for the air cleaner 10.

The operation information displayed on the film display 1040 may include, e.g., operation mode, fan speed, ventilation intensity, air condition, reserve turn-off, filter condition, and air-clean indicator. In the case of the filter condition, if a touch signal is input to a display area for the filter condition, the remaining lifespan may be displayed through a seven-segment display area 1030. The remaining lifespan may be displayed in day units. If the remaining lifespan elapses, the days which have elapsed may be displayed by changing the color displayed through the seven-segment display area 1030. For example, if the remaining lifespan is 71 days, '071' indicating the remaining lifespan may be displayed in GREEN through the seven-segment display area 1030 (refer to FIG. 11). As another example, if eight days have elapsed after the lifespan, '008' indicating the elapsed days may be displayed in RED through the seven-segment display area 1030.

FIG. 12 is a view illustrating an example of transmitting a message to a user's mobile terminal 1300 when the exchange time of a filter elapses.

As set forth above, when the filter exchange time elapses, the air cleaner 10 may transmit a message for requesting to exchange the filter to the user's mobile terminal connected via communication with the air cleaner 10. The message for requesting the filter exchange may include the exchange time and remaining lifespan of the filter, the current air purifying efficiency, and the text for requesting the filter exchange.

Referring to FIG. 12, information regarding the exchange time and purifying efficiency of the filter may be displayed through the display 240 of the mobile terminal 1300. The display area may include a first area 1311, a second area 1312, and a third area 1313. Referring to FIG. 12, the first area 1311 indicates the remaining lifespan of the filter, the second area 1312 indicates the current purifying efficiency of the filter, and the third area 1313 includes the text for requesting the filter exchange.

As shown in FIG. 12, the third area 1313 may include the name of the air cleaner 10. The user may recognize the name of the air cleaner 10 displayed in the third area 1313, thereby recognizing the air cleaner 10 separately from other devices connected via communication.

The above-described present disclosure can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method for predicting lifespan of a filter in an air cleaner, the method comprising:
obtaining, via a sensor, first fine dust concentration data that includes a fine dust concentration of a space within which the air cleaner is placed;
receiving, from an external server, second fine dust concentration data that includes an outdoor fine dust concentration in an outside area to where the air cleaner is placed;
obtaining, from memory, history data related to usage of the air cleaner;
providing the first fine dust concentration data, the second fine dust concentration data, and the history data, to a lifespan prediction model for generating an output value;
determining a purifying efficiency and exchange time of the filter according to the output value;
and calculating variation in fine dust concentration based on the first fine dust concentration data obtained from the sensor while operating the air cleaner and stopping the operating of the air cleaner based on the variation in the fine dust concentration being less than a preset threshold and the filter not being exchanged at an exchange time of the filter.

2. The method of claim 1, wherein the first fine dust concentration data includes at least one of an indoor fine dust concentration before filtering operations of the air cleaner or an indoor fine dust concentration after filtering operations of the air cleaner.

3. The method of claim 1, wherein the history data includes at least one of a user history, an exchange cycle of the filter, or an operation time after which the filter has been exchanged.

4. The method of claim 1, wherein the lifespan prediction model is a previously trained artificial neural network model, with exchange time of the filter being set as training data, and
wherein the exchange time of the filter varies depending on data of the history data that relates to use of the air cleaner and the first fine dust concentration data and the second fine dust concentration data.

5. The method of claim 4, wherein information regarding the exchange time includes a remaining lifespan of the filter of the air cleaner.

6. The method of claim 5, further comprising:
displaying, on a display, information regarding the exchange time of the filter.

7. The method of claim 6, further comprising:
displaying, on a display, a state of the filter in a different color depending on a remaining lifespan of the filter.

8. The method of claim 1, further comprising:
extracting a feature from the history data, the first fine dust concentration data, and the second fine dust concentration data;
providing the feature to the lifespan prediction model for generating a second output value; and
determining the purifying efficiency and the exchange time of the filter according to the second output value of the lifespan prediction model.

9. The method of claim 1, further comprising:
controlling a communication interface to transmit the history data, the first fine dust concentration data, and the second fine dust concentration data, to an artificial intelligence (AI) processor included in a five-generation (5G) network; and
controlling the communication interface to receive AI-processed information from the AI processor, wherein the AI-processed information includes the purifying efficiency and the exchange time of the filter.

10. An intelligent air cleaner, comprising:
a memory;
a sensor;
a transceiver; and
a processor configured to:
obtain, via the sensor, first fine dust concentration data that includes a fine dust concentration of a space within which the air cleaner is placed;
receive, from an external server via the transceiver, second fine dust concentration data that includes an outdoor fine dust concentration in an outside area to where the air cleaner is placed;
obtain, from the memory, history data related to usage of the air cleaner;
provide the first fine dust concentration data, the second fine dust concentration data, and the history data, to a lifespan prediction model for generating an output value;
determine a purifying efficiency and exchange time of the filter according to the output value;
and calculate variation in fine dust concentration based on the first fine dust concentration data obtained from the sensor while operating the air cleaner; and stop the operating of the air cleaner based on the variation in the fine dust concentration being less than a preset threshold and the filter not being exchanged at an exchange time of the filter.

11. The air cleaner of claim 10, wherein the first fine dust concentration data includes at least one of an indoor fine dust concentration before filtering operations of the air cleaner or an indoor fine dust concentration after filtering operations of the air cleaner.

12. The air cleaner of claim 10, wherein the history data includes at least one of a user history, an exchange cycle of the filter, or an operation time after which the filter has been exchanged.

13. The air cleaner of claim 10, wherein the lifespan prediction model is a previously trained artificial neural network model, with exchange time of the filter being set as training data, and
wherein the exchange time of the filter varies depending on data of the history data that relates to use of the air cleaner and the first fine dust concentration data and the second fine dust concentration data.

14. The air cleaner of claim 13, wherein information regarding the exchange time includes a remaining lifespan of the filter of the air cleaner.

15. The air cleaner of claim 14, further comprising:
a display, wherein the processor is further configured to cause the display to display information regarding the exchange time of the filter.

16. The air cleaner of claim 15, wherein the processor is further configured to cause the display to display a state of the filter in a different color depending on a remaining lifespan of the filter.

17. The air cleaner of claim 10, wherein the processor is further configured to:
- control the transceiver to transmit the history data, the first fine dust concentration data, and the second fine dust concentration data, to an artificial intelligence (AI) processor included in a five-generation (5G) network; and
- control the communication interface to receive AI-processed information from the AI processor, wherein the AI-processed information includes the purifying efficiency and the exchange time of the filter.

* * * * *